United States Patent [19]
Onoda et al.

[11] 4,078,645
[45] Mar. 14, 1978

[54] PREPAYMENT FLUID FEEDER

[75] Inventors: Hajime Onoda; Yoshiji Mazda, both of Tokyo, Japan

[73] Assignee: Kimmon Manufacturing Co., Ltd., Tokyo, Japan

[21] Appl. No.: 742,516

[22] Filed: Nov. 16, 1976

[30] Foreign Application Priority Data

Mar. 31, 1976 Japan .............................. 51-38681[U]

[51] Int. Cl.² .............................................. G07F 15/00
[52] U.S. Cl. ...................................................... 194/82
[58] Field of Search ................... 194/3, 5, 82; 222/14, 222/16, 20, 2

[56] References Cited

U.S. PATENT DOCUMENTS 1,889,455  11/1932  Smith ..................................... 194/82

*Primary Examiner*—Stanley H. Tollberg
*Attorney, Agent, or Firm*—Flynn & Frishauf

[57] ABSTRACT

In a prepayment fluid feeder, a depressing member forces down a valve driving member through a coin located in a coin interposing space by an operation of a handle. When the driving member is depressed, a valve member is shifted to an open position, and a fluid such as tap water is supplied through a flow pipe. The driving member is locked by a locking mechanism in a position to which the member is depressed. A releasing mechanism acts on the locking mechanism and releases the locking of the driving member when the supply of a predetermined flow quantity is completed with a single coin, and the valve member is returned to the closed position, thereby stopping the supply of the fluid. The releasing mechanism comprises a setting wheel with notches formed on the outer periphery thereof and balls placed in the notches.

6 Claims, 7 Drawing Figures

PREPAYMENT FLUID FEEDER

The present invention relates to a prepayment fluid feeder for supplying a fluid such as tap water by fixed quantities, which is operated by insertion of coins thereinto.

Such type of device may generally be disposed in a flowing system between a source of a fluid, such as tap water or gas, and the side on which such fluid is to be used. Any user who wants to get a supply of the fluid may put a prescribed amount of coins into a coin slot of the device. The device has a valve for opening and closing the flowing system. On insertion of coins, the valve is opened automatically or by user's operation of a lever or button to allow the fluid to be supplied. The coin available for the device may be a cash coin or a prescribed substitute discoid piece of metal available at a prescribed price, varying with the specifications of the device. Thus, the coin to be used with this type of prepayment device may not generally be limited to currency. In some cases, spheroids may be available.

The aforementioned device eliminates need of door-to-door inspections of meters. Since used coins are to be collected from a locked coin receptacle in the device, any supplier of the fluid should only unlock the receptacle and withdraw coins. Therefore, a supplier would not be required to conduct the conventional frequent (e.g., monthly) bill collection business from house to house, but is only required to perform occasional (e.g., once a half year) regular collection. In such regular collection, he would be able to check meters for any troubles and improper use at the same time. Accordingly, the device will be able to improve the inspection of meters and collection of money which are now critical issues and is expected to be widely accepted in the future.

Among the conventional prepayment fluid feeders are known those which are so constructed as to discriminate between regular coins and false ones and open their valves by electrically sensing the introduction of coins. These conventional devices, however, are generally complicated in construction, so large in size that they each require a wide space as well as a high manufacturing cost, and are not very satisfactory in durability.

An object of the present invention is to provide a prepayment fluid feeder capable of operating actions including opening and closing of a valve and discrimination of false coins by a totally mechanical means, arranged compactly, high in durability, and capable of being manufactured at a low cost.

SUMMARY OF THE INVENTION

In a preferred embodiment according to the present invention, said device is provided with a valve operating member operatively connected to a valve member for opening and closing fluid passage. A depressing member is disposed correspondingly to an active end at the top of said driving member with a coin interposing space provided therebetween. When a user operates the lever with a coin introduced into said space through the coin slot of the device, the depressing member lowers and the driving member is depressed, thereby shifting the valve member to the open position. A locking means shifts transversely or radially against the longitudinal axis along the shifting direction of said driving member and the driving member is held in place by the locking means. When a quantity of fluid equivalent to a single coin has been supplied, said locking means is returned to its original position by a lock releasing means, the locking of the driving member is released, and the valve member is returned to the closed position. Said releasing means is connected to a flow measuring system and so designed as to nullify the action of the locking means when a quantity of fluid to be supplied by means of a coin is measured by said measuring system. The releasing means comprises a setting wheel with one or more arcuate notches formed on the outer periphery thereof and a ball or roller disposed in the or each of said notches.

One end of a coin receiving guide frame is connected to the coin slot of the device, while the other end thereof opens into said coin interposing space and is provided with an outlet for false coins. On each side wall of the guide frame is arranged a magnet near said other end thereof in such a manner that two different magnetic poles face each other. The coin available is embedded with a magnet so that each side of the coin exhibits different magnetic polarity. The coin is to be put into the slot in such an orientation that it may be applied with a repulsive force when it passes through the area about a pair of opposite magnets placed on the guide frame. By such a repulsive force the coin will be pushed out of the guide frame in the direction toward the coin interposing space. Any false coin, however, would not be applied with any such repulsive force when it passes through said area, but forced out through the outlet.

BRIEF DESCRIPTION OF THE DRAWINGS

This invention can be more fully understood from the following detailed description when taken in conjunction with the accompanying drawings, in which.

DETAILED DESCRIPTION

Figure 1:
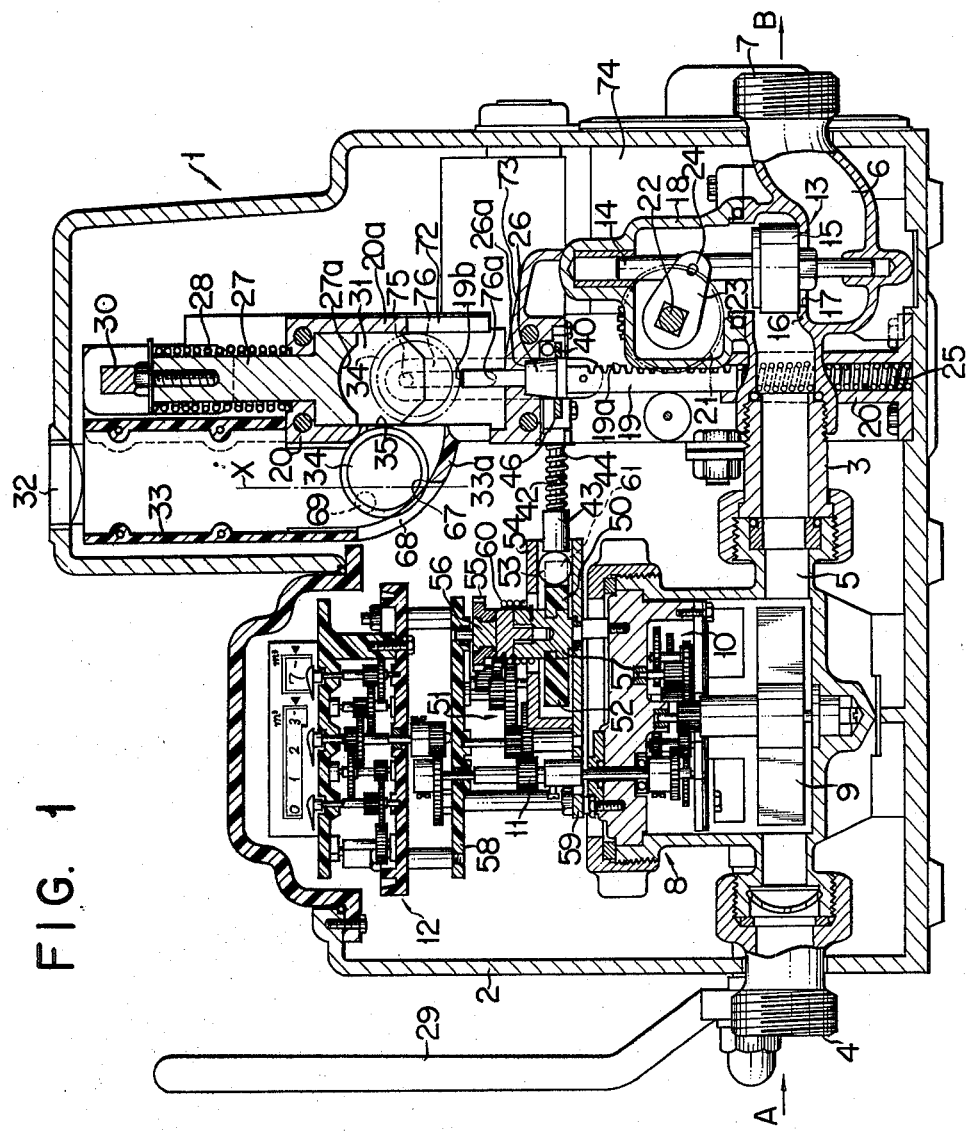
FIG. 1 is a general longitudinal section of an embodiment of the prepayment fluid feeder according to the present invention.

Referring to FIG. 1, there is generally shown a prepayment fluid feeder 1 according to the present invention. In this device 1 a fluid to be supplied is tap water. At the lower portion within a housing 2 of the device 1 is arranged a flow pipe 3, the left-hand end portion thereof being connected to a source of tap water (not shown) by means of a suitable pipe, while the right-hand end portion thereof is connected to a tap or a dispensing accessory (not shown) by means of a suitable pipe. Thus, the tap water will be taken in at an inlet 4 as indicated by the arrow A, passed through an inlet-side passage 5 and an outlet-side passage 6 within the flow pipe 3, and then discharged from an outlet 7 as indicated by the arrow B.

In said inlet-side passage 5 is located an impeller 9 of a measuring system 8. The flow quantity of the tap water flowing through the passage 5 is converted into rotatary energy of the impeller 9, which will be transmitted to an output gear 11 by means of a series of gears 10. Accordingly, the output gear 11 rotates continuously according to the flow quantity. Said output gear 11 is connected to a flow quantity totalizer 12 disposed above the measuring system 8, said totalizer 12 adding up and indicating the flow quantity or consumption of tap water. The measuring system 8 and flow quantity totalizer 12 themselves are not very different from those with conventional constructions.

A valve 13 is interposed between the inlet-side passage 5 and the outlet-side passage 6. This valve 13 is operated to pass by or intercept the flow of tap water within the flow pipe 3. Said valve 13 has a valve stem 14 which is adapted to move vertically so as to be capable of only vertically moving a valve member 15 fixed to said valve stem 14. In the closed position of the valve 13 as shown in FIG. 1 wherein the valve member 15 abuts against a valve seat 16, the flow of tap water is intercepted and there is no supply. When the valve member 15 is off the valve seat 16 and is brought to the open position as the valve stem 14 is raised, a valve aperture 17 is opened, the inlet-side passage 5 and the outlet-side passage 6 communicate with each other, and the tap water is supplied.

The valve 13 is contained in a valve casing 18 attached in liquid-tight relation to the flow pipe 3.

A valve driving member 19 is supported by a supporting frame 20 erected within the housing 2 in such a manner that said driving member 19 can be moved reciprocatively only in the vertical direction. On one side of said member 19 is formed a rack 19a, which engages with a pinion 21, whose bearing shaft 22 passes through the valve casing 18 in liquid-tightness. The extended end of the bearing shaft 22 is fixed by an end of a crank lever 23, which is connected to the valve stem 14 at the other end by a pin-and-slot connection 24. Therefore, if the valve driving member 19 is lowered from the original top position as shown in FIG. 1, the valve member 15 will be shifted to the open position. The driving member 19 is always forced upward by a compression spring 25 disposed thereunder. Just below the upper end 19b of the driving member 19 is a truncated-coniform member 26 fixed integrally to the member 19. This truncated-coniform member 26 is usually fitted into a recess (without reference numeral) corresponding to the shape of the member 26 which is formed on the supporting frame 20 by the action of the compression spring 25, thereby holding the driving member 19 against the spring 25.

A vertical depressing member 27 is arranged above the driving member 19 and supported by the supporting frame 20 in such a manner as to allow vertical reciprocation of the member 27. The depressing member 27 is usually held at the non-operating position as shown in FIG. 1. The descending action of said member 27 is made against a compression spring 28 by turning a handle 29 on the left of the device 1 as shown in FIG. 1. In FIG. 1 however, the transmission mechanism between the handle 29 and the depressing member 27 is not shown in detail. Nevertheless, such mechanism will easily be understood by any persons skilled in the art because it is not any special mechanism but, in actual fact, one of those conventional combinations of a series of links. A movable member 30 of rectangular cross-section is shown as a final member in said transmission mechanism. When the handle 29 is turned, the movable member 30 lowers to force down the depressing member 27 against the compression spring 28.

When the depressing member 27 is at the non-operating position as shown in FIG. 1, there is defined a coin interposing space 31 between a concave depressing surface 27a formed at the bottom of the depressing member 27 and the upper end 19b of the driving member 19 within the supporting frame 20.

A coin slot 32 opens to air at the top portion of the housing 2 of the device 1. The supporting frame 20 is fixed with a coin containing guide frame 33 by one end opening into the slot 32 and the other end communicating with said coin interposing space 31 through a coin feeding inlet 35. A coin 34 inserted into the slot 32 is guided by the guide frame 33 and sent into the coin interposing space 31. The construction of this portion of the apparatus will be further described in detail hereinafter.

The depressing member 27 is so designed that even if the handle 29 is turned through a predetermined full angle, to lower the depressing member 27 to its lowermost positions, the depressing surface 27a does not directly contact the upper end 19b of the driving member 19. When the coin 34 is located in the coin interposing space 31 as indicated by a chain line in FIG. 1, the depressing surface 27a pushes the coin 34 downward and the coin 34 urges the upper end 19b of the driving member 19 downward, in turn, Thus, the depressing member 27 moves the driving member 19 downward from its original position against the spring 25.

Figure 2:
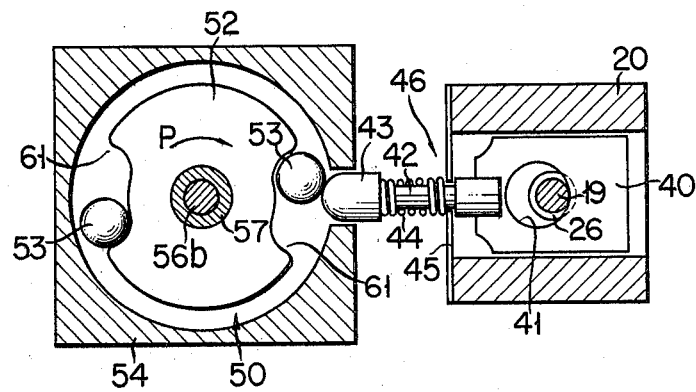
FIG. 2 is a partial view of the device as illustrated in FIG. 1 in which a locking means and a releasing system in particular of the device are shown.
Figure 3:
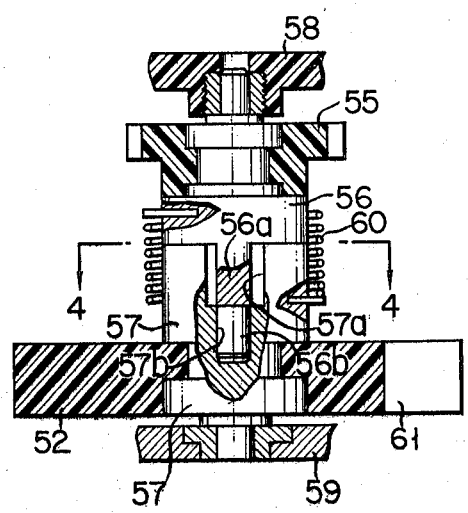
FIG. 3 is a partial view of the device as illustrated in FIG. 1 in which the connective relation between a setting wheel and a final gear in a reduction gear means is specifically shown.

A locking plate 40 with a hole 41 fitted loosely with the truncated-coniform member 26 of said driving member 19 is disposed perpendicularly to the axis of the driving member 19. This plate 40, as shown in detail in FIG. 2, is fixed by one end of a rod 42, the other end thereof being provided with a roundtipped head 43 formed integrally with the rod 42. A coil spring 44 is wound on the rod 42. One end of the spring 44 is held against the head 43, while the other end against a stop plate 45 fixed onto the supporting frame 20. A locking means 46 is composed of the plate 40, rod 42, head 43, and spring 44. The plate 40, rod 42, and head 43 are so set that they are always forced by the spring 44 leftward as seen in FIGS. 1 and 2, and capable of moving only perpendicularly to the longitudinal axis of the driving member 19.

When the driving member 19 is at the original position, the hole 41 of the plate 40 engages with the tapered lateral side of the truncated-coniform member 26 at the right edge thereof. As the driving member 19 is depressed, the truncated-coniform member 26 is also lowered. Meanwhile, the plate 40 is gradually shifted leftward by the action of the spring 44 with the right edge of the hole 41 contacting the side of the member 26. When the truncated-coniform member 26 has passed downward through the hole 41, the plate 40 is shifted rapidly leftward by the action of the spring 44 and stopped at the position where the left edge of the hole 41 hits against the upper rod portion of the driving member 19. In such a situation, the plate 49 partially hangs over the top surface 26a of the truncated-coniform member 26. Accordingly, the driving member 19 is locked at a position hereinafter referred to as the locking position in which the bottom surface of the plate 40 abuts against the top surface 26a of the truncated-coniform member 26. When the drivng member 19 is located in the locking position, the valve member 15 is shifted to the full-open position.

Figure 4:
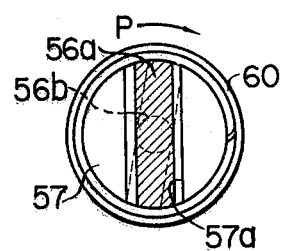
FIG. 4 is a cross-sectional view of FIG. 3 taken along line 4—4.

Above said measuring system 8 is disposed a releasing mechanism 50 for nullifying the action of said locking means 46. Said releasing mechanism 50 includes a reduction gear mechanism 51, setting wheel 52, balls 53, and wheel housing 54. One end of the reduction gear mechanism 51 is connected to said output gear 11, while the other end terminates at a final gear 55. The final gear 55 has a stepped shaft 56 formed integrally therewith. At the lower portion of the shaft 56 is integrally formed a narrow protrusion 56a extending diametrically and a shaft portion 56b subsequent thereto (FIG. 4). The setting wheel 52 is provided with a stepped shaft 57 secured rigidly thereto, and there are formed a wide groove 57a extending diametrically through the shaft 57 and a shaft hole 57b. Further, the shaft portion 56b is fitted rotatably in the shaft hole 57b to provide an axial alignment of both shaft members, and the protrusion 56a is loosely inserted into the groove 57a. Thus, both shafts 56 and 57 are so constructed as to be able to rotate relatively through a fixed angle corresponding to the free space between the protrusion 56a and groove 57a. The action relevant to such relative rotation will be described in detail hereinafter. The top end portion of one shaft 56 and the bottom end portion of the other shaft 57 are rotatably supported by a base plate 58 of the totalizer 12 and a base plate 59 of the releasing mechanism 50 respectively. A coil spring 60 is wound around the outer periphery of both shafts 56 and 57. The top end of said coil spring 60 is fixed to the shaft 56, while the bottom end to the shaft 57. As shown in FIG. 2, the setting wheel 52 has a pair of arcuate notches 61 formed diametrically on the outer periphery thereof. Each notch 61 contains one of said balls 53 disposed rotatably therein. Since the wheel 52 is enclosed with the wheel housing 54 with a slight gap left, the balls 53 cannot run out of the respective notches 61.

Figure 5:
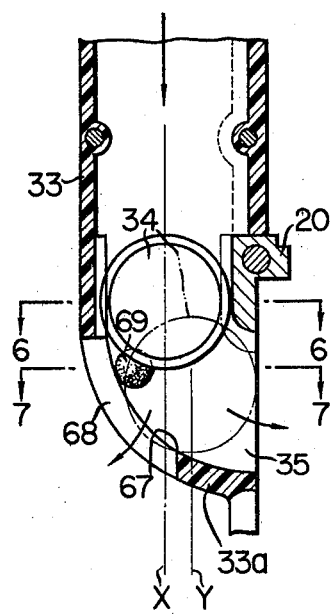
FIG. 5 is a partial view of the device as illustrated in FIG. 1 in which a guide frame portion for guiding coins in particular of the device is shown.
Figure 6:
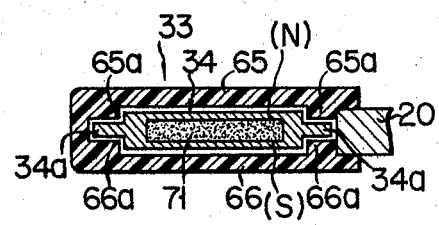
FIG. 6 is an enlarged cross-sectional view of FIG. 5 taken along line 6—6.
Figure 7:
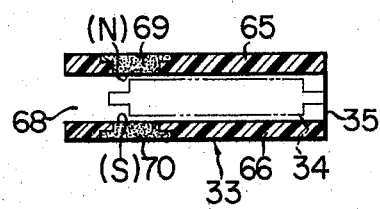
FIG. 7 is an enlarged cross-sectional view of FIG. 5 taken along line 7—7.

Referring now to FIGS. 5, 6 and 7, there is shown the detailed construction of the coin containing guide frame 33. The guide frame 33 has plastic side members 65 and 66 laterally spaced from each other and is attached to the supporting frame 20 by means of screws or the like. A guide passage for a coin 34 is defined by the space between the side members 65,66. Stepped guide portions 65a and 66a formed in a substantially inner middle portion of the side member 65,66 extend lengthwise of the side members 65,66 such that the shape of the section of the guide passage is corresponds to the profile of the coin 34 used here with its outer periphery portion 34a formed thinner than the other peripheral portion. Therefore, the coin 34 put in at the slot 32 will drop along a vertical line X. The dropping coin 34 is so designed as to hit first against the edge 67 of an abutment portion 33a. The abutment portion 33a is so formed that the edge 67 is located in an offset position at the right of the line X. The lower right portion of the guide frame 33 opens into the coin interposing space 31 through the coin feeding inlet 35, while the lower left portion has a false coin outlet 68. Magnets 69 and 70 for discriminating coins are attached to both side members 65 and 66 in the vicinity of the lower portion of the guide frame 33 at the right of the line X in such a manner that they face each other across a passage within the guide frame. The facing magnetic poles of the magnets 69 and 70 have polarities (N,S) opposite to each other.

The regular coin 34 used here is composed of a discoid body made of a non-magnetic material such as non-magnetic metal or plastic and a magnet 71 embedded therein. The magnet 71 causes both sides of the coin 34 to a different polarity (N), (S). In putting such special coin 34 into the coin slot 32, said coin 34 should be so oriented that each side of the coin have the same polarity with the corresponding magnet 69 or 70 as the coin 34 drops through the passage within the guide frame 33 and passes through the area about the pair of magnets 69 and 70. Then the coin 34 is applied with a repulsive force from the magnets 69 and 70 while it passes through said area. Accordingly, the coin 34 is shifted toward the right side of the line X or toward the coin feeding inlet 35 communicating with the coin interposing space 31 as indicated by the arrow after hitting against the edge 67.

If any false coin different from the aforesaid coin 34 is put into the guide frame 33 through the coin slot 32, the false coin will drop along the line X and never be applied with any repulsive force while it passes through the area about the magnets 69 and 70. As a result, such false coin will be discharged naturally by its own weight through the outlet 68 as indicated by the arrow after hitting against the edge 67. This is because the edge 67 is located in an offset position at the right of the line X.

Thus, a discrimination between regular coins exclusively used with the device of the present invention and false coins may be made by such a simple construction without employing any expensive electric selecting mechanism.

In order to enable any person to put a coin 34 into the slot 32 in the proper orientation, it is recommendable for instance to form a projection and a recess respectively on one and the other sides of the coin 34 as well as a recess and a projection on one and the other sides of the guide frame 33 correspondingly so as to prevent the coin from being put into the slot in the wrong orientation. However, such construction is not shown in any drawings because it is to be easily understood by any persons skilled in the art.

Now we will describe hereinafter the operation of the device according to the present invention with the aforementioned construction. Further descriptions of any operations already mentioned hereinbefore will be omitted.

If a user who wants to be supplied with tap water puts a regular coin 34 into the slot 32, the coin will fall into the space 31, and hit against a blocking wall 20a formed integrally with the supporting frame 20 and stops at a position where it is placed on the top end 19b of the driving member 19 as shown by the dotted line in FIG. 1.

By the operation of the handle 29, the depressing member 27 forces the driving member 19 downward by means of the coin 34, and the member 19 is held in the locking position by the locking means 46. As a result, the valve means 13 is opened to start supply of tap water. As the tap water is supplied, its flow quantity is continuously measured by the measuring system 8. In the meantime, the setting wheel 52 is rotated continuously clockwise as indicated by the arrow P in FIG. 2. At the end of the supply of a predetermined quantity of tap water for a single coin, one of the balls 53 engages the head 43 of the locking meas 46 as shown in FIG. 2.

When the wheel 52 is further rotated, the ball 53, in close contact with one corner of the notch 61, forces the head 43 rightward against the spring 44. At that time, the protrusion 56a on the shaft 56 is located in the position illustrated by the dotted line as shown in FIG. 4 to push against the wall surface of the groove 57a on the shaft 57. In this position, spring tension is accumulated in the coil spring 60.

The bottom surface of the plate 40 slides on the top surface 26a of the truncated-coniform member 26 immediately before the ball 53 reaches the apex portion of the head 43, thereby releasing the abutment with said top surface 26a. Then the truncated-coniform member 26 rises promptly through the hole 41 of the plate 40 by the action of the spring 25, thereby returning the driving member 19 to the original position. Thus, the valve 13 is closed to intercept the supply of tap water.

While said truncated-coniform member 26 rises through the hole 41, the plate 40 is shifted rightward for a short distance by the action of the coniform side of the member 26. Accompanying this, the head 43 comes off the ball 53. Thus the force applied on the ball 53 and wheel 52 from the head 43 in the direction opposite to the arrow P is dissipated, so that the wheel 52 will quickly rotate relative to the shaft 56 by the action of the coil spring 60. The angular range of such relative rotation is equivalent to the angular range allowed by the loosely-engaging relation between the protrusion 56a of the shaft 56 and the groove 57a of the shaft 57. By the quick relative rotation of the wheel 52, the ball 53 is pushed by one edge of the notch 61 and rolled abruptly toward the other edge of the notch 61, thereby detached completely from the position opposite to the head 43. Consequently, the driving member 19 is forced down again to the locking position to prevent the head 43 from hitting against the ball 53 when the plate 40 is going to shift leftward as regards FIG. 2 and restraining such shifting of the plate 40, thereby securing positive locking action.

If a further supply of tap water is wanted, one should only repeat the operation as described above. The flow quantity supplied for each single coin may be set optionally by properly selecting the rotation speed of the setting wheel 52 or the numbers of the notches 61 and balls 53 to be provided for the wheel 52. Thus, though in this embodiment of the present invention two notches 61 are formed on the wheel 52, one or three or more notches may also be formed. In case a plurality of notches 61 are arranged, it is essential to locate them equidistantly.

If the handle 29 is returned to the original position after the driving member 19 has once been held in the locking position due to a fall of the depressing member 27 by the aforesaid operation of the handle 29, the depressing member 27 will rise. The coin 34 within the coin interposing space 31 will be rolled over an incline 73 from said space 31 to the outside through the outlet 72 for discharging the used coin and dropped into a coin collecting box 74 disposed below. This collecting box 74, usually locked, is so constructed as to be unlocked only at time of withdrawal of coins by the supplier of tap water.

While the driving member 19 is in the locking position, the depressing member 27 may not be raised up to the original non-operating position, but is restricted to the intermediate position. That is, as indicated by the broken line in FIG. 1, the depressing member 27 is fixed with a pin 75, while the driving member 19 is fixed with a coupling member 76 provided with a longitudinal slot 76a engaged with said pin 75. Thus, the depressing member 27 is located at an intermediate position due to the engaging relation between the pin 75 and the slot 76a.

When the depressing member 27 is at the intermediate upward position, the lower end portion of the member 27 partially closes up the coin feeding inlet 35, so that any coin subsequently put in through the slot 32 may be prevented from penetrating into the coin interposing space 31. This is for the purpose of preventing any subsequent coin from rolling out of the outlet 72 immediately after it has been put into the space 31 while the driving member 19 is in the locking position. Accordingly, the subsequent coin 34 may stay for instance at the position indicated by the chain line in FIG. 5. In this position, a line Y including the center of gravity (i.e. center of the circle in this case) of the coin 34 is located at the right of the edge 67, so that the coin 34 would never drop onto the side of the outlet 68. Therefore, some spare coins 34 may be temporally held in the guide frame 33. When the driving member 19 is returned to the original position after completion of supply of tap water for a single coin, the depressing member 27 is also returned to the non-operating position, thereby opening the coin feeding inlet 35. Then another coin 34 is automatically put into the space 31. If a user put into the space 31 a plurality of coins equivalent to the desired quantity to be supplied, he will be able to obtain rapid and substantially continuous supply of tap water only by operating the handle 29 without adding a coin each time a supply for each single coin is completed and the valve means is closed. Any used coins collected in the collecting box 74 are to be withdrawn periodically by the supplier of tap water. Below the false coin outlet 68 may be provided another collecting box or a guide for discharging flase coins outward.

Although in this embodiment of the present invention tap water has been illustrated as a supplied fluid, it is to be understood that any other kinds of liquids or gas may also be supplied. In any device for supplying gas, however, it should be essential to consider satisfactory airtightness at gas flowing portions.

Thus, the device according to the present invention is composed of a combination of simple mechanical components without employing any electric system which is complicated and susceptible to trouble. Therefore, this device has advantages as compared with the conventional devices of this type, such as reliability in performance, high durability, and compactness as a whole.

What we claim is:

1. A prepayment fluid feeder for supplying a fixed quantity or fluid equivalent to a single coin comprising:
   a flow passage;
   a measuring system for converting the flow quantity of a fluid flowing through said flow passage into rotatory energy and giving an output gear continuous rotation equivalent to the flow quantity;
   valve means having a valve member capable of moving between an open position in which the fluid is allowed to flow through said flow passage and a closed position in which the flow of fluid is intercepted;
   a valve driving member operatively connected with said valve member and capable of reciprocating along the longitudinal axis thereof between an original position to locate the valve member in said closed position and a locking position to locate the valve member in said open position, said valve driving member having a truncated-coniform portion formed integrally therewith;

urging means for urging said driving member toward said original position;

a depressing member normally held in a non-operating position apart from said driving member so that the depressing member defines a coin interposing space together with an active end of said driving member in the original position, and capable of moving from said non-operating position toward the active end of the driving member, said depressing member shifting the driving member about a shifting axis from the original position to the locking position through a coin which is interposed between said depressing member and the driving member is said coin interposing space;

locking means for locking the shifted driving member at the locking position, thereby holding said valve member in the open position, said locking means including a locking plate provided with a hole fitted loosely with said truncated-coniform portion formed therein and capable of moving only in the radial direction to the shifting axis of the driving member;

a spring for urging said locking plate toward said radial direction:

said locking plate abutting against the top surface of the truncated-coniform portion when the driving member is shifted from the original position to the locking position, thereby holding the driving member in the locking position;

a coin containing guide frame with one end opening into a coin slot and the other end communicating with said coin interposing space;

reduction gear means including a series of gears and connected to the output gear of said measuring system; and releasing means for nullifying the action of said locking means when the number of revolutions of the output gear has reached a prescribed level through said reduction gear means, restoring the driving member to the original position, and thereby returning the valve member to the closed position.

2. A prepayment fluid feeder according to claim 1, wherein said locking means has a head on the side opposite to said locking plate; and said releasing means includes a setting wheel having arcuate notches formed through a fixed range along the outer periphery thereof and capable of rotating with the rotation of the output gear and balls placed in said notches of the wheel, and said balls being engaged with the head of said locking means accompanying the rotation of the setting wheel, the locking plate thereby moving transversely against the spring, the truncarted-coniform portion entering the hole in the locking plate, and the driving member being allowed to return to the original position.

3. A prepayment fluid feeder according to claim 2, wherein said setting wheel is provided with a pair of said arcuate notches opposed diametrically to each other and each of said balls is placed in each notch.

4. A prepayment fluid feeder according to claim 3, further comprising a wheel shaft member rigidly secured to said setting wheel and which is allowed to rotate through a fixed angle relative to a gear shaft member rigidly secured to a final gear included in said reduction gear means and coupled coaxially with said wheel shaft member, and a coil spring anchored between said wheel shaft member and said gear shaft member.

5. A prepayment fluid feeder according to claim 1, wherein said coin containing guide frame is provided with magnets arranged respectively in the two side walls near the lower end portion thereof so that different magnet poles are opposed to each other; a magnet is so embedded in a regular coin that both sides of the coin have different magnetic polarity from each other, said coin being applied with repulsive forces from a pair of magnets while it passes through an area about said pair of magnets, and thereby fedding into said coin interposing space.

6. A prepayment fluid feeder according to claim 5, comprising means responsive to a false coin put into said coin guide frame and which is not applied with any repulsive force from said pair of magnets while the coin passes through the area about said magnets, for discharging the false coin through a false coin outlet at the lower end portion of said coin guide frame.

* * * * *